Aug. 23, 1927.
H. N. WAYNE
RESILIENT WHEEL
Filed Feb. 26, 1924
1,639,827
2 Sheets-Sheet 1
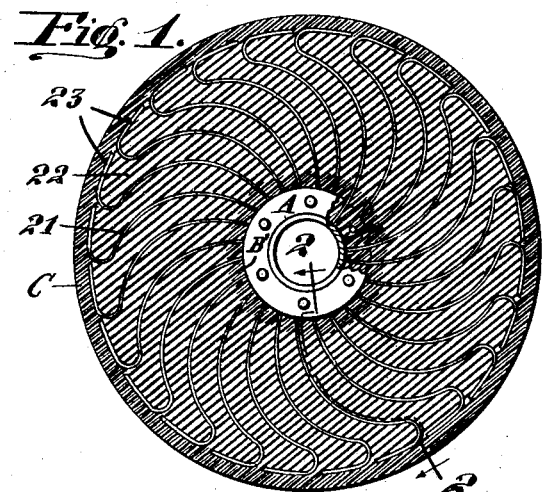
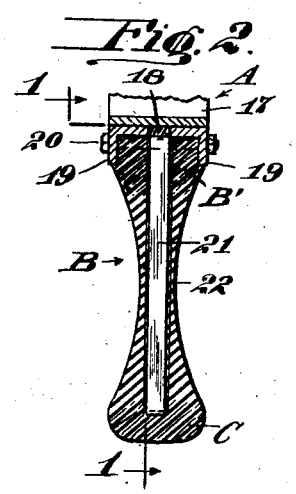
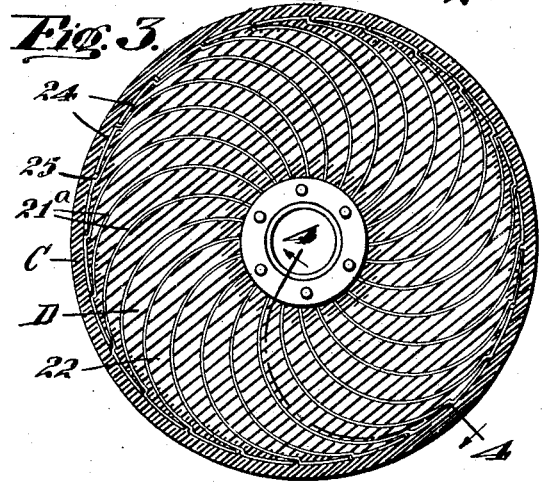
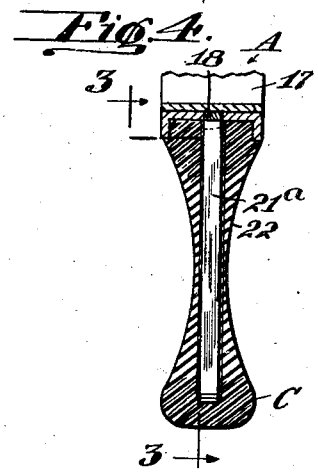
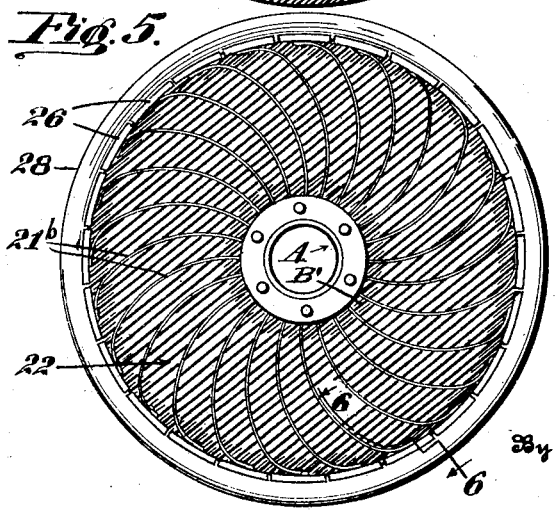
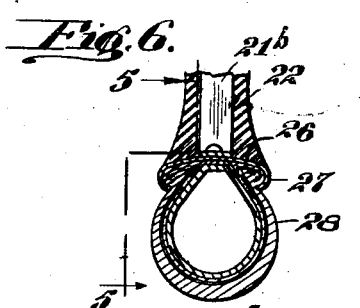
Inventor
Herbert N. Wayne;
By R. S. Berry
Attorney Aug. 23, 1927.

H. N. WAYNE

RESILIENT WHEEL

Filed Feb. 26, 1924 2 Sheets-Sheet 2

1,639,827

Inventor
Herbert N. Wayne;
By R. S. Barr
Attorney

Patented Aug. 23, 1927.

1,639,827

UNITED STATES PATENT OFFICE.

HERBERT N. WAYNE, OF SANTA MONICA, CALIFORNIA.

RESILIENT WHEEL.

Application filed February 26, 1924. Serial No. 695,151.

This invention pertains to that class of wheels in which the portion of the wheel extending between the hub or central part and the rim or periphery thereof is formed to be yieldable and resilient, and especially relates to that type of resilient wheels in which the wheel structure is so constructed as to provide a flexible and elastic support for loads imposed on the wheel so as to cushion and absorb shocks.

An object of this invention is to provide a resilient wheel of the above character, which, while presenting the qualities of flexibility, resiliency and capability of absorbing shocks, will also have such strength and stability as to resist excessive distortion by distribution throughout the wheel structure of the strains imposed thereon.

Another object is to provide a wheel embodying a resilient or cushioning body extending between the hub and perimeter the wheel, which body comprises a composition in the form of rubber or other suitable material reinforced by flexible spokes, whereby the outer peripheral portion of the wheel will be movable both diametrically and circumferentially relative to the axis of the wheel under elastic resistance.

A further object is to so form the resilient body as to give it greater flexibility throughout an area intermediate a portion thereof adjacent the hub and a portion forming the wheel perimeter.

Another object is to provide a wheel having flexible spokes connected to the wheel hub and extending therefrom to the wheel rim portion, in which the spokes are embedded in a resilient material which fills the spaces between the spokes, and in which the resilient material is formed to have greater density throughout areas adjacent the inner and outer ends of the spokes so as to offer greater resistance to the flexure of the spokes at their ends than at their middle portions, thereby strengthening the wheel at the connections of the spokes, and also imparting stability thereto.

Another object is to provide a resilient wheel which is especially applicable for use as a vehicle wheel, particularly on automobiles and the like.

A further object is to provide a wheel of the above character which may be adapted to have any suitable tread construction applied to its periphery so that it may be adapted to carry usual mountings for pneumatic or cushion tires either of the clincher rim or demountable type, or may be formed with an integral tread portion and the use of separate tires be dispensed with.

With the foregoing objects in view, together with such other objects and advantages as may subsequently appear, my invention resides in the parts and in the construction, combination and arrangement of parts hereinafter described and claimed, and illustrated by way of example in the accompanying drawings, in which—

Figure 1 is a view of the wheel as seen in longitudinal section on the line 1—1 of Figure 2, showing one form of the invention in which the wheel is provided with a continuous flexible rim and integral tire portion.

Figure 2 is a view in transverse section as seen on the line 2—2 of Figure 1.

Figure 3 is a view in longitudinal section as seen on the line 3—3 of Figure 4, showing a modified construction of the form of the invention shown in Figure 1.

Figure 4 is a view in transverse section as seen on the line 4—4 of Figure 3.

Figure 5 is a view in longitudinal section as seen on the line 5—5 of Figure 6, showing another form of the invention in which the wheel is provided with an articulate rim portion and as fitted with a tire.

Figure 6 is a detail in section as seen on the line 6—6 of Figure 5.

Figure 7:
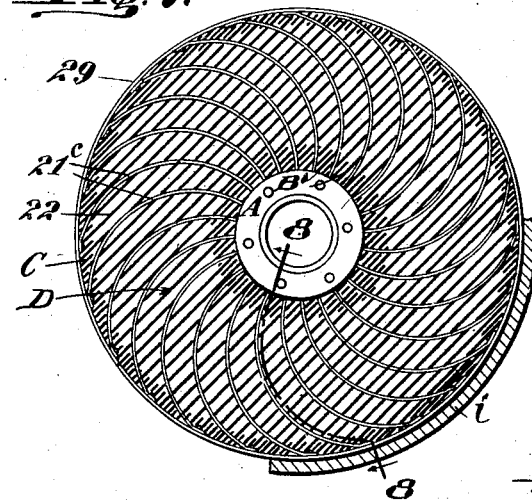
Figure 7 is a view in longitudinal section as seen on the line 7—7 of Figure 8, showing another form of the invention in which the wheel is provided with a continuous flexible metal rim; portions of the tire being broken away.

Referring to the drawings more specifically, A indicates the wheel hub which may be of any suitable construction, being here shown as comprising a tubular cylinder 17 fitted with an annular flange 18 intermediate the ends thereof and having annular flanges 19—19 at its ends and between which flanges 19—19 is clamped the wheel body structure B by means of bolts 20, which extend through the flanges and engage the wheel body; but any other suitable means of attaching the wheel body to the hub may be employed.

The essence of the present invention resides in the construction of the wheel body B and consists in forming the wheel body with a series of curved flexible spokes 21 that are embedded in a resilient wall 22 formed of a composition of rubber or other suitable material; the material of the wall 22 filling the spaces between the spokes 21 and may surround the spokes from the inner end portions thereof to their outer end portions. The wheel is thus formed with a unitary resilient elastic and flexible body extending from the hub or central portion thereof to the periphery of the wheel.

The spokes 21 may be of any suitable construction being here shown in the assembled views as formed of curved plate springs which may have any desired curvature. The springs extend between the hub and the rim portion of the wheel.

Figure 13:
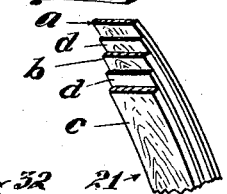
Figures 13 and 14 are fragmentary views in perspective illustrating ways of constructing the flexible spokes.
Figure 14:
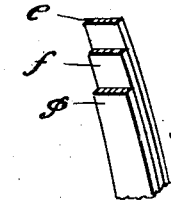

The spokes may be formed of any thoroughly dried and seasoned wood, preferably ash, and where greater flexibility and toughness is desired several thin strips of wood $a$, $b$, and $c$ with an intermediate layer of elastic material $d$, preferably rubber, between each individual strip, the whole being formed and vulcanized into a single spoke unit, as shown in Figure 13. Or they may comprise a plurality of strips of spring steel or a combination of steel and wood, as indicated at $e$, $f$ and $g$ in Figure 14, preferably three of such strips being employed in each spoke; these strips $e$, $f$ and $g$ being quite thin and arranged face to face in such manner that the outer strips may slide longitudinally relative to the intermediate strip.

The inner ends of the spokes 21 are preferably connected to the hub A by disposing them in open slots or channels $h$ formed in the periphery of the flange 18 with the end faces of the spokes abutting against the bottom walls of the channel $h$ to oppose end thrusts on the spokes; the end flanges 19—19 extending over the ends of the channels $h$ and serving to collectively hold the springs in place. However, any other approved means may be employed whereby a substantial connection may be effected between the spokes and hub.

The outer end portions of the spokes are formed according to the character of the rim construction desired. In the form of the invention shown in Figure 1 the outer end portion of the spoke is bent rearwardly, as indicated, to form a shoe 23 which extends in the direction of the circumference of the wheel and terminates contiguous to the outer end portion of the adjacent spoke in such manner that the outer end portions of the spokes may have relative movement diametrically and circumferentially of the latter independent of each other.

In the form of the invention shown in Figure 3 the outer end portions of the spokes $21^a$ are extended to successively overlap each other in the direction of the circumference of the wheel, as indicated at 24; the extremity of each spoke $21^a$ terminating contiguous to a shoulder 25 formed on the adjacent spoke.

In the construction shown in Figures 1 and 3 the end portions 23 and 24 of the spokes 21 and $21^a$ respectively are wholly embedded in the material of the wheel wall 22, which, with the end portions of the spokes, constitute the rim or peripheral portion of the wheel and by reason of the ends of the spokes being movable relative to each other, provides a wheel with a rim portion which is adapted to be flexed diametrically of the wheel and to be elastic circumferentially thereof.

In the form of the invention shown in Figure 5, the outer end of each spoke $21^b$ is rigidly secured to an arcuate shoe 26, the shoe on each spoke $21^b$ extending contiguous to and spaced slightly from the shoes on the contiguous spokes; the shoes 26 serving collectively to form the perimeter of the wheel. These shoes may be formed with inturned side flanges 27 as shown in Figure 6 so as to adapt them to receive the clincher beads of an ordinary pneumatic tire 28. These shoes however may be formed to receive any desired form or type of tire.

The shoes 26 are independent of each other and thereby provide the wheel with an articulate and flexible rim portion which will permit flexure of the rim diametrically of the wheel and will also permit of circumferential elastic elongation of the wheel rim within the confines of the tire.

Figure 8:
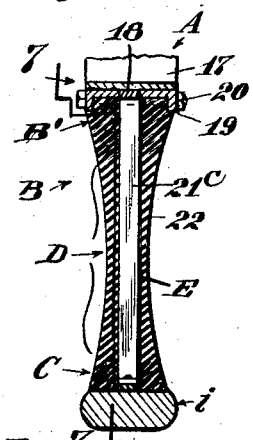
Figure 8 is a view in transverse section as seen on the line 8—8 of Figure 7.

In the form of the invention shown in Figure 7 the outer ends of the spokes are secured to a continuous band 29 which is preferably formed of spring steel so that the rim of the wheel will be flexible diametrically of the wheel but will not have circumferential elasticity. The band 29 may be encircled by a cushion tread which may be formed in continuation of the body or wall of the wheel, as indicated at $i$ in Figure 8.

Figure 9:
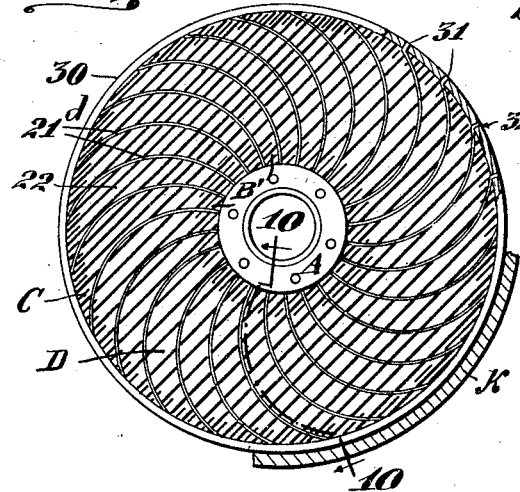
Figure 9 is a view in longitudinal section as seen on the line 9—9 of Figure 10, showing a further modified form of the invention in which the wheel is fitted with a continuous rigid rim; portions of the tire being broken away.
Figure 10:
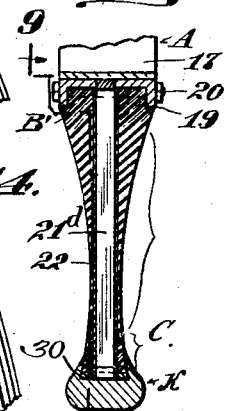
Figure 10 is a view in transverse section as seen on the line 10—10 of Figure 9.
Figures 11, 12:
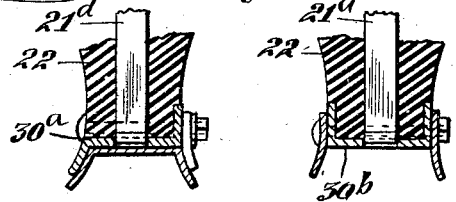
Figures 11 and 12 are details in section of the rim portion of the wheel shown in Figure 9, illustrating modified forms of the wheel rim adapted to receive the conventional vehicle tires.
Figure 15:
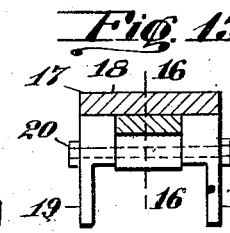
Figure 15 is a detail in section showing a manner of constructing the wheel hub.
Figure 16:
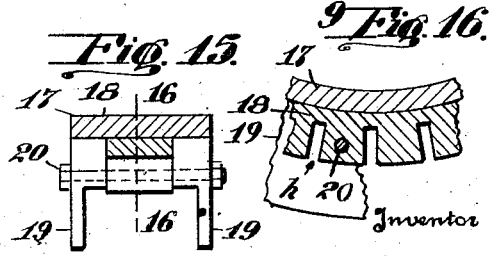
Figure 16 is a detail in section as seen on the line 16—16 of Figure 15.

In the form of the invention shown in Figure 9, the outer ends of the spokes $21^d$ are attached to a rigid band 30, being here shown as connected to the rim by having the terminations of the spokes $21^d$ formed with outward projections 31 that extend into and engage openings 32 formed in the rim to receive them. By the constructions shown in Figures 7 and 9 the outer ends of adjacent spokes $21^c$ and $21^d$ respectively are held in fixed spaced relation to each other, as distinguished from the constructions shown in Figures 1, 3 and 5. The band 30 may be of any suitable form in cross section to adapt it to receive a tire, as shown for example at $30^a$ and $30^b$ in Figures 11 and 12 respectively, but in some instances the band 30 may be embedded in the material of which the wheel body or wall is formed, as indicated at $k$ in Figure 10.

While in some instances the wheel may be formed with the resilient wall of uniform character throughout, it may be provided with portions of variable density or flexibility, the wall 22 which constitutes a disk being preferably formed with a portion B′ adjacent the hub or center of the wheel and with a portion C at the perimeter thereof of greater density than that of a portion D intermediate the portions B′ and C, by which construction the intermediate portion D will possess greater flexibility than the central portion B′ and rim portion C. The portion B′ at the hub is preferably formed of hard or nearly hard rubber or similar composition and serves as a substantial anchorage for the inner ends of the spokes, which portion B′ merges into the more flexible portion D. The portion C at the perimeter of the wheel may also be formed of hard rubber or of a relatively stiff cushion rubber which also merges into the more flexible intermediate portion D.

In some instances the spokes may be initially embedded in a layer or coating of relatively hard rubber as indicated at E to create a binding between the spokes and the main elastic body extending between the spokes, which layer may be of any desired thickness and may act as a stiffening agent to assist in opposing too free flexing of the spokes.

The operation of the invention will be understood from the foregoing, but briefly stated, is as follows: When the wheel perimeter is resting on a surface and a load is imposed on the wheel hub as through an axle and wheel spindle supported by the hub in the usual manner, the portion of the wheel body or disk below the hub will be compressed while the portion above the hub will be elongated. The extent of elongation of the upper portion of the wheel disk will be dependent upon the character of the rim construction employed, as where the flexible rim shown in Figure 7 or the articulate rims shown in Figures 1, 2 and 3 are used this elongation may be negligible, as the displacement effected by compression of the lower portion of the wheel may be largely confined to such lower portion due to the flexing of the wheel rim particularly when the wheel is subjected to light shocks, but when heavy shocks are imposed on the wheel they will be distributed throughout the wheel body by reason of the continuity of the wheel structure.

In manufacturing the wheel, the wheel structure including the hub member, spokes, and rim member together with the rubber body is placed in a suitable mold and vulcanized into a unitary whole. It is understood that where the term "rubber" is used throughout the specification and claims it means vulcanized rubber or rubber composition vulcanized by any of the accepted methods of vulcanization.

I am aware that it is old to form a wheel with a hub and a rim portion that are movable diametrically with respect to each other and in which a wall of rubber supplemented with spokes extend between the hub and rim portion, as exemplified in United States Patent No. 1,168,035, issued January 11, 1916, and I therefore do not broadly claim such construction as my invention, but what I do claim and desire to secure by Letters Patent is:

1. In a resilient wheel, a rigid hub member, a disk comprising a wall of elastic material carrying said hub member, and a series of flexible spokes embedded in the material of said disk and having their inner ends associated with said hub, said spokes being curved and having their outer ends terminating in the peripheral portion of said disk.

2. In a resilient wheel, a rigid hub, an elastic disk associated with said hub having a flexible rim portion, said disk comprising a wall of elastic material extending between the hub and the rim portion, and a series of flexible spokes associated with said hub at their inner ends and having their outer ends terminating in the flexible rim portion.

3. In a resilient wheel, a rigid hub, an elastic disk carrying said hub having a flexible rim portion, said disk comprising a wall of elastic material extending between the hub and the rim portion, and a series of flexible spokes associated with said hub at their inner ends and having their outer ends terminating in the flexible rim portion, said wall and spokes being yieldably movable both diametrically and circumferentially relative to said hub.

4. In a resilient wheel, a hub, a disk formed of rubber composition, a series of spring spokes embedded in said composition associated with the hub and terminating at their outer ends in the rim portion of the disk, and shoes on the outer ends of said spokes; adjacent shoes being capable of articulate movement relative to each other.

HERBERT N. WAYNE.